(12) United States Patent
Orenstein et al.

(10) Patent No.: US 6,270,433 B1
(45) Date of Patent: Aug. 7, 2001

(54) PLAYER POSITION DETECTION SYSTEM

(75) Inventors: Henry Orenstein, Verona, NJ (US); James J. Maune, Plainview, NY (US)

(73) Assignee: Toy Builders, Caldwell, NJ (US)

( * ) Notice: Subject to any disclaimer, the term of this patent is extended or adjusted under 35 U.S.C. 154(b) by 0 days.

(21) Appl. No.: 09/081,906

(22) Filed: May 20, 1998

Related U.S. Application Data (60) Provisional application No. 60/069,473, filed on Dec. 15, 1997.

(51) Int. Cl.[7] ........................................................ A63F 9/22
(52) U.S. Cl. ................................................................ 473/467
(58) Field of Search .................................. 473/131, 351, 473/353, 467, 570, 459, 469, 409; 342/52, 56, 125–126, 450, 457, 458, 463–465; 340/825, 825.36

(56) References Cited

U.S. PATENT DOCUMENTS

| | | | |
|---|---|---|---|
| 3,782,730 | 1/1974 | Horchler | 473/353 |
| 4,542,906 | 9/1985 | Takase et al. | 473/152 |
| 4,673,183 | 6/1987 | Trahan | 342/465 |
| 4,675,816 | 6/1987 | Brandon et al. | 473/353 |
| 4,833,480 | 5/1989 | Palmer et al. | 342/125 |
| 4,836,551 | 6/1989 | LaSalle | 473/152 |
| 5,138,322 | 8/1992 | Nuttall | 473/467 |
| 5,150,895 | 9/1992 | Berger | 473/467 |
| 5,346,210 | 9/1994 | Utke et al. | 342/450 |
| 5,363,297 | 11/1994 | Larson et al. | 342/126 |
| 5,401,026 | 3/1995 | Eccher et al. | 473/199 |
| 5,423,549 | 6/1995 | Englmeier | 473/570 |
| 5,564,698 | 10/1996 | Honey et al. | 473/570 |
| 5,582,550 | 12/1996 | Foley | 473/353 |
| 5,615,880 | 4/1997 | Booth et al. | 473/570 |

*Primary Examiner*—Mark Sager
(74) *Attorney, Agent, or Firm*—Baker Botts L.L.P.

(57) ABSTRACT

A system for locating players on a field includes first and second directional scanning antennas located adjacent the field. A transponder carried by the players detects the radiation from each antenna and transmits timing signals. The timing signals are received at a central station and compared to reference timing signals synchronized with the scanning of the antennas to provide an indication of the angular position of each player from the scanning antenna locations. The actual field position of the players can then be computed. The system can also locate the position of a playing object, such as a ball.

19 Claims, 9 Drawing Sheets

PLAYER POSITION DETECTION SYSTEM

This application claims the benefit of Provisional Application Serial No. 60/069,473, filed Dec. 15, 1997.

BACKGROUND OF THE INVENTION

This invention relates to arrangements for detecting the position of players in a sporting event, and particularly for detecting the occurrence of an "off-side" violation in a soccer game. An off-side condition occurs when the ball is passed to an offensive player who is forward of all defensive players except the goalie. Accordingly, to properly supervise the play of the game, the official must observe players as well as the play of the ball. Determining relative position of players on the field can be difficult because the angle at which the official observes the players will not always coincide with the transverse coordinate of the field. Similar rules concerning the position of players apply in hockey and other games.

Various attempts have been made to provide a system for automatically locating a ball or player on a field. For example, in Brandon et al., U.S. Pat. No. 4,675,816, an electronic tracking system is described wherein a transmitter is located on a ball and a pair of tracking antennas are mounted adjacent the field. The antennas are arranged to track, i.e. point toward the ball and the position of the ball is computed from the pointing angle of the antennas. The Brandon systems requires two antennas to track each object, and it would accordingly require a large number of antennas to track all players on a field. Further, it is not clear that the angular direction-tracking system used by Brandon provides sufficient accuracy.

It is therefore an object of the present invention to provide an improved player/ball tracking system that can simultaneously locate many players on a field and provide assistance to game officials in calling the play of the game.

SUMMARY OF THE INVENTION

In accordance with the invention there is provided an apparatus for determining the position of an object, such as a person or a ball, in a field, which includes first and second directional antennas at different locations adjoining said field. Each of the antennas has first and second antenna beam patterns having predetermined relation to an electromagnetic antenna boresight. The antennas are mounted for rotation to scan the antenna beams across the field. The apparatus further includes transmitting and receiving apparatus for transmitting signals between the object and the first and second directional antennas using the first beam pattern, and for transmitting signals between the object and the first and second directional antennas using the second beam pattern. Comparison circuits are coupled to the receiving apparatus for comparing received signals corresponding to the first and second beam patterns, thereby to generate timing signals corresponding to the first and second directional antenna boresight coinciding with the object position. A reference timing apparatus provides time reference signals for the antenna beam scanning of the first and second antennas and computation circuits respond to the timing signals and the time reference signals for computing position of the object.

In a preferred arrangement the first and second antenna beam patterns comprise horizontally offset antenna beams having equal pattern amplitude at the electromagnetic antenna boresight. The transmitting and receiving apparatus may transmit the first and second signals at different frequencies from the first and second directional antennas, and the receiving apparatus and comparison circuit can be on the object. The timing signals from the comparison circuit can be transmitted from the object to the computation circuits.

In an alternate arrangement, a transmitter can be located on the object and the received signal of the first and second antenna beams can be compared at each directional antenna to generate the timing signals.

In accordance with the invention there is provided a method for locating objects on a field, wherein signals are radiated toward the field and the signals are periodically swept across the field from first and second locations, providing at positions on the field periodic signals having intensities as a function of time that correspond to the angular direction from the locations to the position. A receiver is provided on each object to be located and signals received by the receivers are analyzed to thereby determine the angular direction of the objects from the locations.

According to an alternate method, signals are radiated from the objects on the field and received by directional antenna patterns sweeping across the field.

For a better understanding of the present invention together with other and further objects, reference is made to the following description, taken in conjunction with the accompanying drawings, and its scope will be pointed out in the appended claims.

DESCRIPTION OF THE PREFERRED EMBODIMENTS

Figure 1:
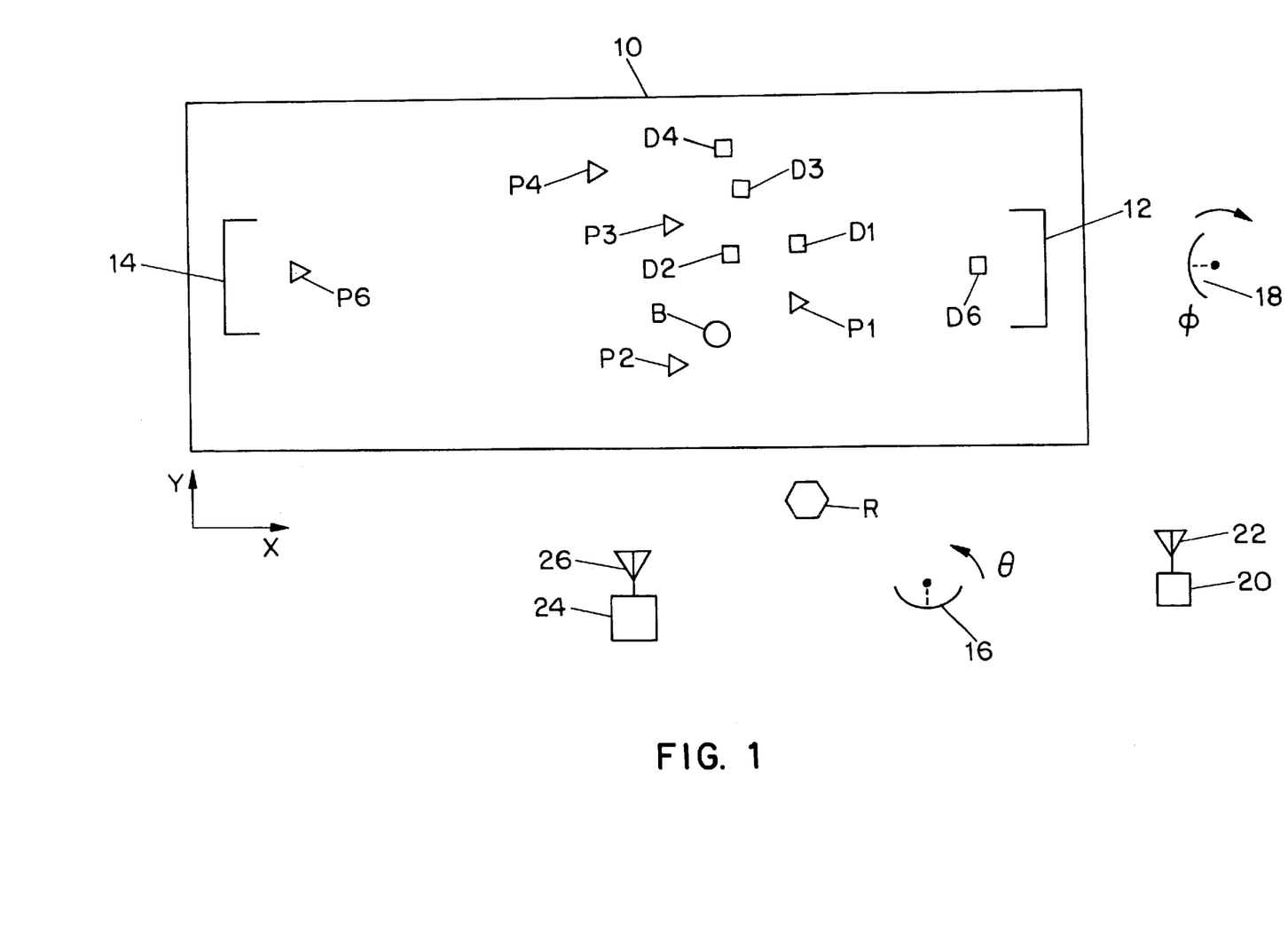
FIG. 1 is a top view of a playing field showing a first arrangement of the system of the present invention.

Referring to FIG. 1, there is shown a top view of a soccer field 10 having a player position system according to a first embodiment of the present invention. The system includes a pair of scanning antennas 16 and 18. Antenna 16 is positioned on one side of field 10 near goal 12. Antenna 18 is located behind goal 12. With this positioning of antennas 16 and 18, the corresponding antenna beams are approximately perpendicular to provide highest accuracy of position detection in the area of the field corresponding to the approach to goal 12. A similar antenna pair may be provided at the opposite end of the field to provide position detection near the approach to goal 14. Other scanning antenna positions are possible, including arrangements wherein a single pair of antennas provide position locations over the entire field.

In addition to scanning beam antennas 16 and 18, there may be provided a reference signal receiver 20 with a broadbeam antenna 22 providing a reference timing signal and a central station 24.

Each of the players, except possibly goalies P6 and D6, is provided with a transponder 50, which detects signals from both scanning antennas and also detects the reference signal where present. In response, the transponders emit pulses at a frequency that is unique to each transponder.

The transponder pulses are received by central station 24, having antenna 26. At central station 24 the signals are timed for each transponder, and the resulting time measurements are provided to a computer for determining player position.

Figure 2:
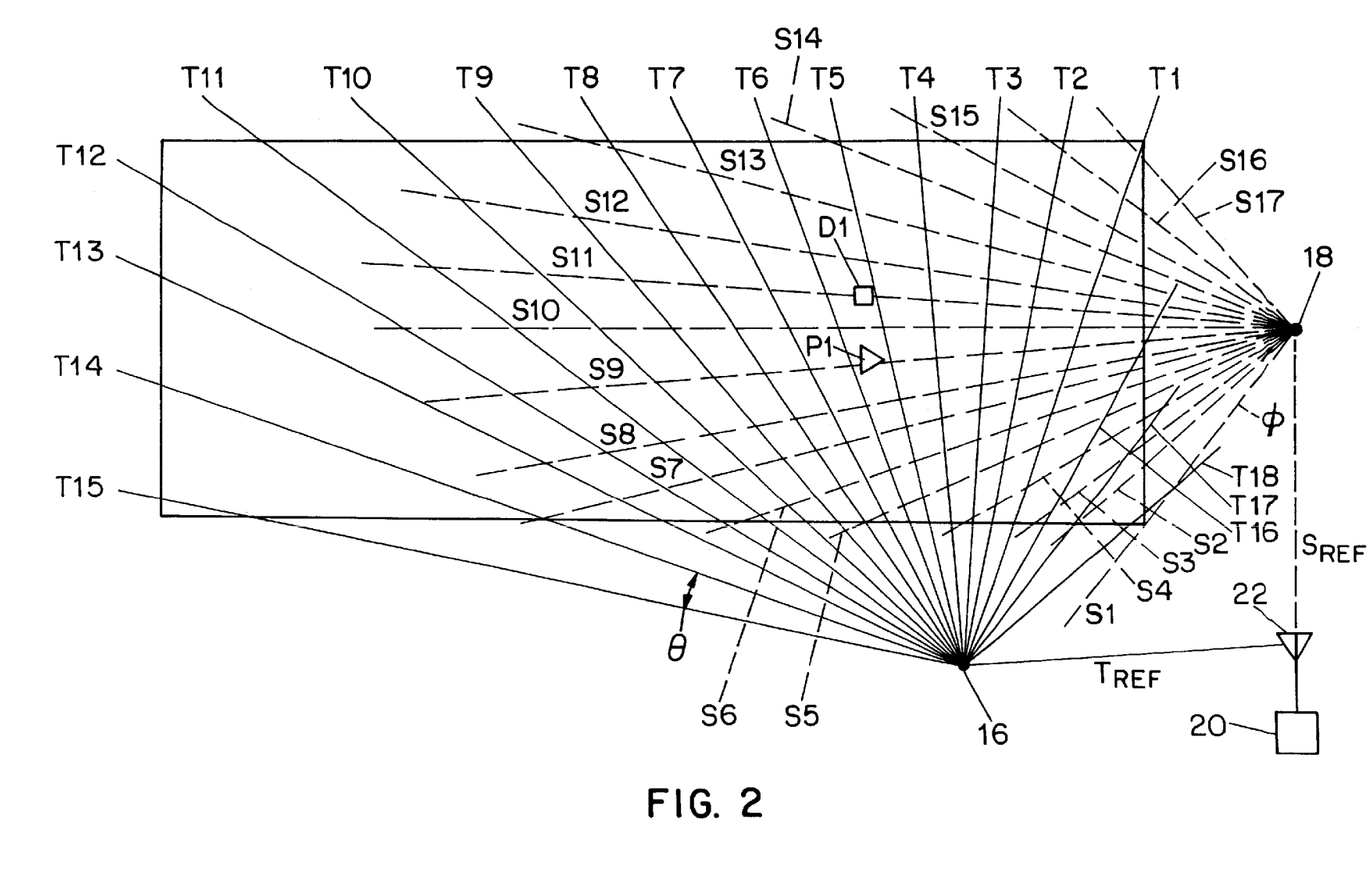
FIG. 2 is a top view of a playing field showing a sequence of radiation beams.

Referring to FIG. 2, there is depicted the sequence of signals from scanning antennas 16 and 18. Antenna 16 is rotating counter-clockwise and provides scanned antenna beams T1, T2, T3, etc. Naturally, the antenna beams move continuously between the indicated directions. Antenna 18 rotates clockwise and provides a sequence of beams S1, S2, S3, etc. The transponder on each player, such as player D1 and P1, will receive the signals from antennas 16 and 18 at a time which is dependent on the player's angular location with respect to each of the antennas. Thus player D1 will receive the signal from antenna 16 before player P1. Player P1 will also receive the signal from antenna 18 before player D1.

The signals from antennas 16 and 18 are also received by reference receiver 20, for purposes of providing reference timing signals. In one arrangement, the reference timing signals are provided from receiver 20 responding to the scanning beams to provide a reference timing pulse by wire connection or radio transmission to central station 24. Alternately, reference signals may be transmitted onto field 10 by a transmitter provided at reference receiver 20.

Figure 5:
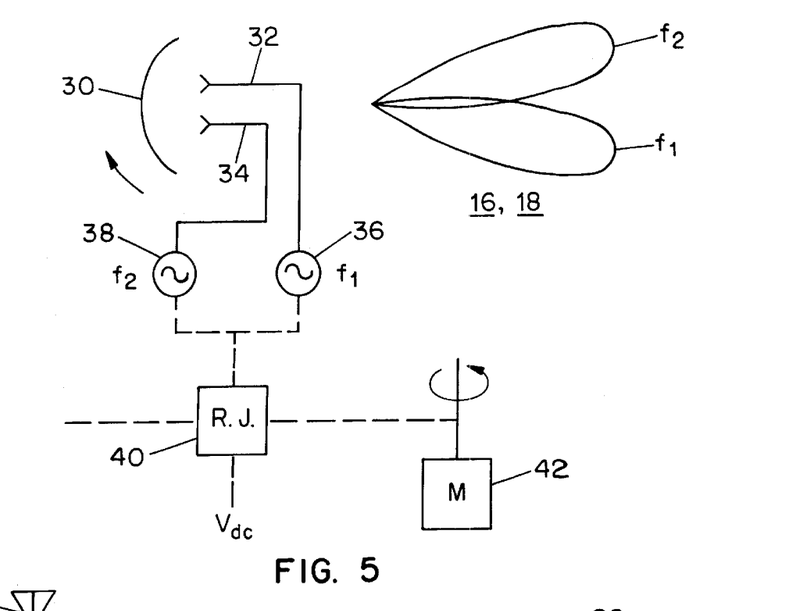
FIG. 5 shows a transmitter and antenna useful in the FIG. 1 system.

In a preferred arrangement of the invention the antenna beams radiated from scanning antennas 16 and 18 are dual frequency, dual beam patterns. Referring to FIG. 5, scanning transmitters 16 and 18 are provided with dual oscillators 36, 38, each generating a different frequency. The output signals from oscillators 36, 38 are provided respectively to horizontally-offset feed antennas 32, 34 which illuminate reflector 30. As a result, the antenna radiates horizontally adjacent antenna beams with two frequencies, as indicated in FIG. 5. The beams have equal amplitude at the antenna boresight. Accordingly, a transponder can detect accurately when the antenna boresight is pointing at the transponder, when e.g. a crossover occurs between the received amplitudes of the f1 and f2 signals.

In order to achieve the same type of timing accuracy for the reference signal, the reference receiver 20 also detects the time adjacent shaped beams at f1 and f2 as the antennas 16 and 18 scan across the position of reference receiver 20.

The time reference signal may be provided to the central station 24 in various ways. First, reference receiver 20 may comprise a transponder of the type carried by the players and having its own reference transponder frequency. In this arrangement, the reference timing signal is received by the central station in a manner similar to signals from other transponders. Second, the reference timing signal may be provided to the central station by a wire connection, whereby the detected crossover $f_1$–$f_2$, received by the reference receiver 20, is provided to control station 24 which can be co-located with reference receiver 20.

Figure 6:
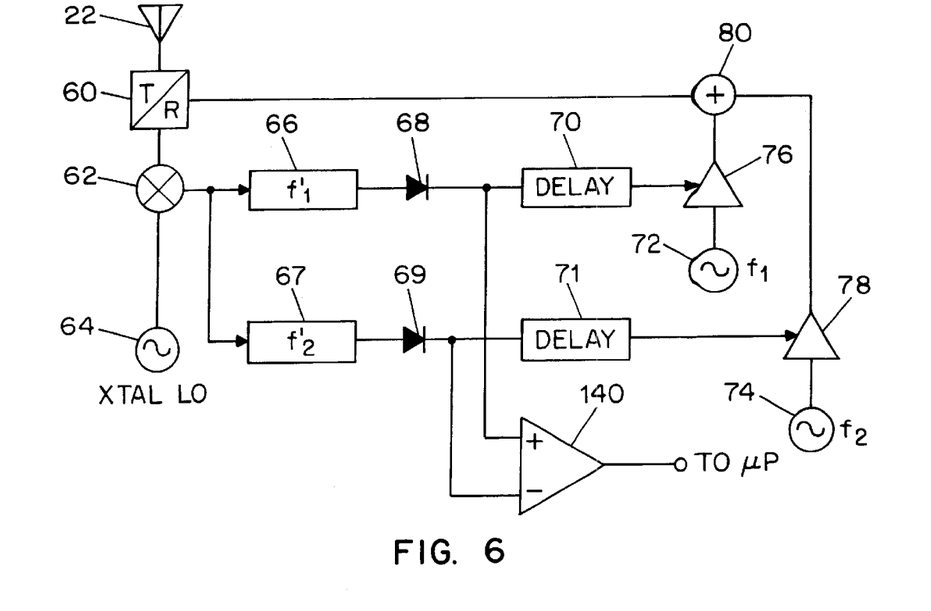
FIG. 6 shows one arrangement of a reference time signal apparatus useful in the FIG. 1 system.

In another alternate arrangement, the reference receiver 20 may comprise a transponder as shown in FIG. 6, which transmits a reference signal onto field 10 in a wide beam pattern whereby each player transponder 50 responds to the reference signal as well as the scanning beam signal.

An exemplary reference transponder as shown in FIG. 6 includes antenna 22 positioned, e.g., between scanning antennas 16 and 18, as shown in FIG. 1. When antenna 16 scans across the position of reference antenna 22, the dual frequency signals are provided by T/R switch 60 to mixer 62. Mixer 62 is also provided with local oscillator signal 64, and the two resulting difference frequency IF signals are filtered in filters 66, 67 and detected by detectors 68, 69. Equal length delay lines 70, 71 are provided. These delay lines may be, e.g., charge-coupled devices, or may be acoustic or digital delays. The output of the delays are used to control the output of locally generated signals from oscillators 72 and 74 in voltage controlled amplifiers 76, 78. These signals are combined in adder 80 and provided to antenna 22 by T/R switch 60. As a result, the reference signal will comprise dual-frequency, shaped pulses similar to those received, but delayed in time to permit operation of T/R switch 60. By use of the reference transponder, the reference signal will have the same time profile and cross-over characteristics as the scanning beam signal from antennas 16 and 18 when observed by a transponder 50 on field 10.

Figure 3A:
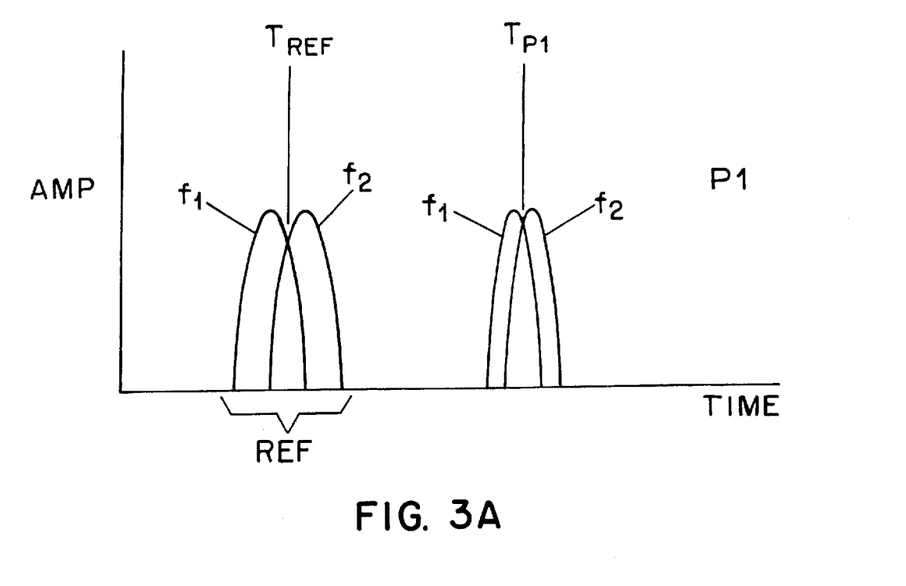
FIGS. 3A and 3B show time sequences of signals associated with players from a first antenna.
Figure 3B:
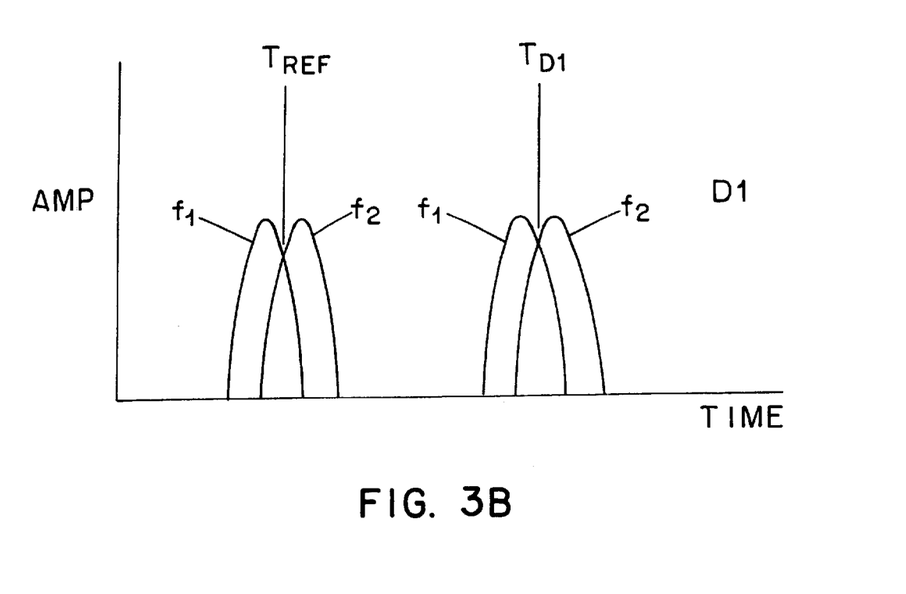
Figure 4A:
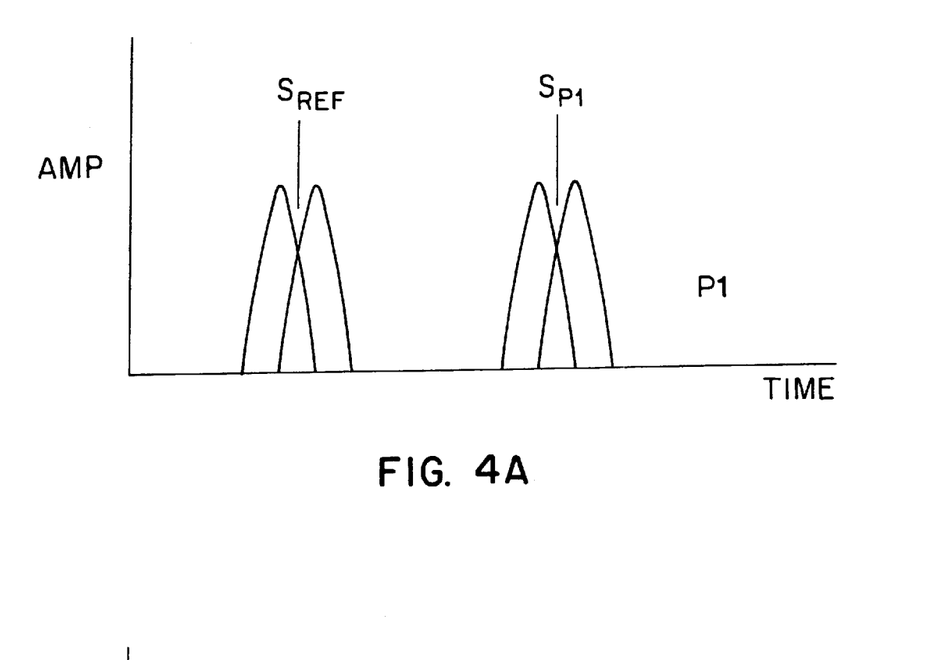
FIGS. 4A and 4B show time sequences of signals associated with players from a second antenna.
Figure 4B:
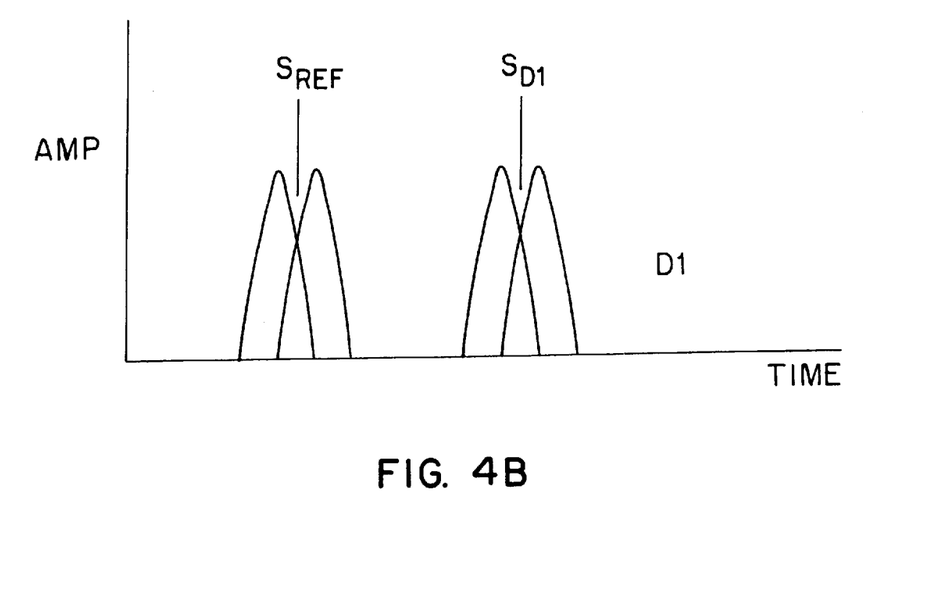

FIGS. 3 and 4 illustrates observation of the reference and scanning beam signals, it being understood that the reference signal may be observed by receiver 20 or, where a reference transponder is provided, by the transponder carried by the players . A first reference signal T REF is generated immediately prior to the time the beam from antenna 16 starts to traverse the field. At a later time, which depends on the position of the player transponder on the field, the player transponder P1, D1, etc. receives the dual frequency signal which occurs at a time after the reference signal, which depends on the angular transponder location.

Figure 7:
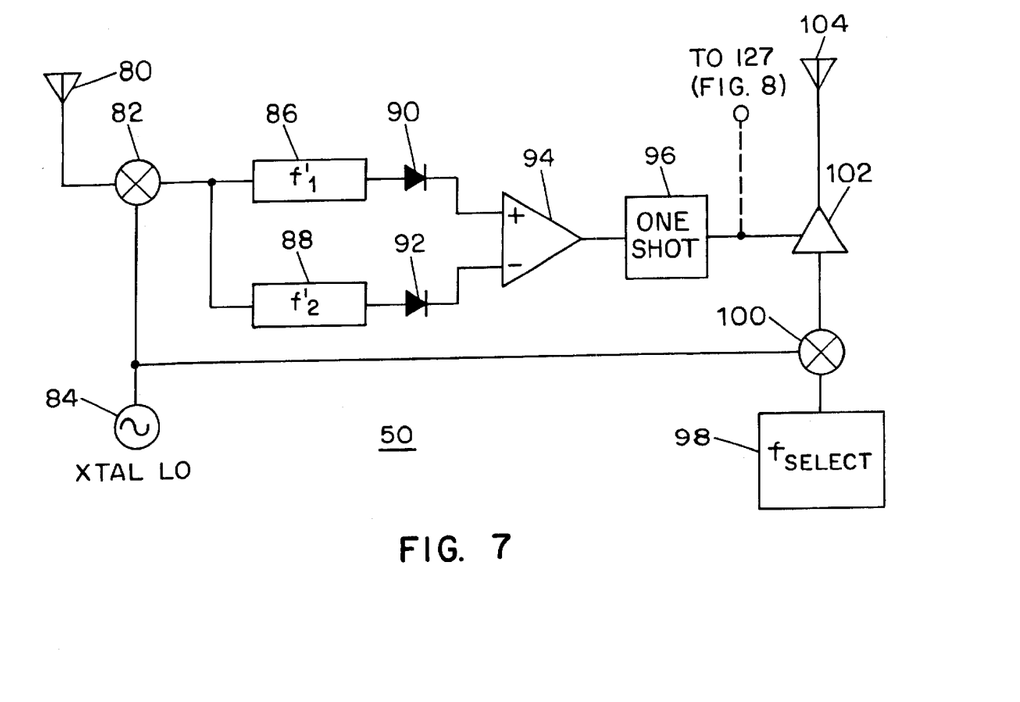
FIG. 7 shows a receiver and comparison circuit useful in the FIG. 1 system.

FIG. 7 illustrates one version of a player transponder. The dual frequency scanning signals are received by transponder antenna 80 and provided to mixer 82, which also receives signals from local oscillator 84. The two frequencies produce different intermediate frequency signals f1' and f2', which are filtered by bandpass filters 86 and 88 and detected by detectors 90, 92. The detected signals are compared in differential amplifier 94 to find the f1–f2 crossover time and a corresponding pulse is created by one-shot 96. This cross-over triggers a transmitted pulse by amplifier 102, which is preferably at a different frequency than the reference and scanning signals, usually in an entirely different frequency band. Since the critical factor is the time interval between the reference signal and the scanning signals, differences in the two receiver channels are unimportant, since the same changes are replicated for the reference and scanning signals. As mentioned, the transponder 50 of FIG. 7 can also be used to provide a reference receiver which transmits the cross-over pulse signal by either radio or logic signal to the central station.

FIGS. 4A and 4B show the timing of signals received by transponders for players D1 and D2 respectively from scanning antenna 18.

Figure 9:
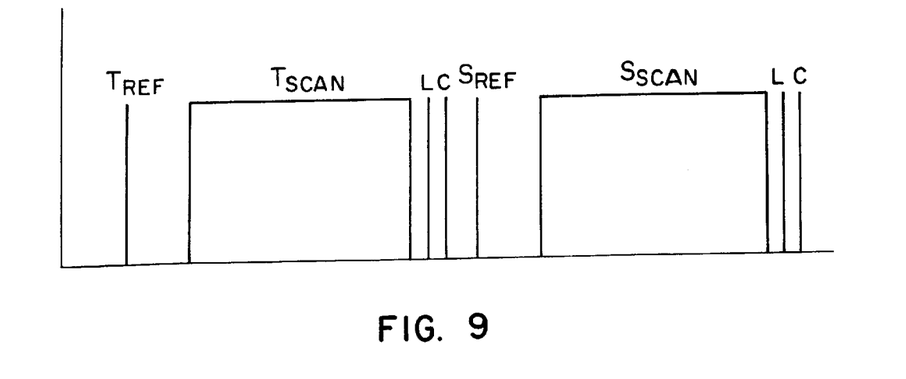
FIG. 9 shows a possible time sequence useable in the FIG. 1 system.

FIGS. 9 shows an overall timing sequence. Antennas 16 and 18 are preferably synchronized, e.g., by using a d.c. motor controlled by a phase-locked loop responsive to shaft encoders, to have constant rotational speed and to face the field at mutually exclusive 180° intervals of their rotation. The antennas are preferably inactive when facing away from the field (except when facing the reference transponder), to minimize interference on account of reflections.

As shown in FIG. 9, a rotational cycle includes a reference timing signal, followed by a scan across the field by antenna 16 (T SCAN) followed by another reference transmission, followed by a field scan by antenna 18 (S SCAN). Events L and C relate to data processing as will be explained.

Figure 8:
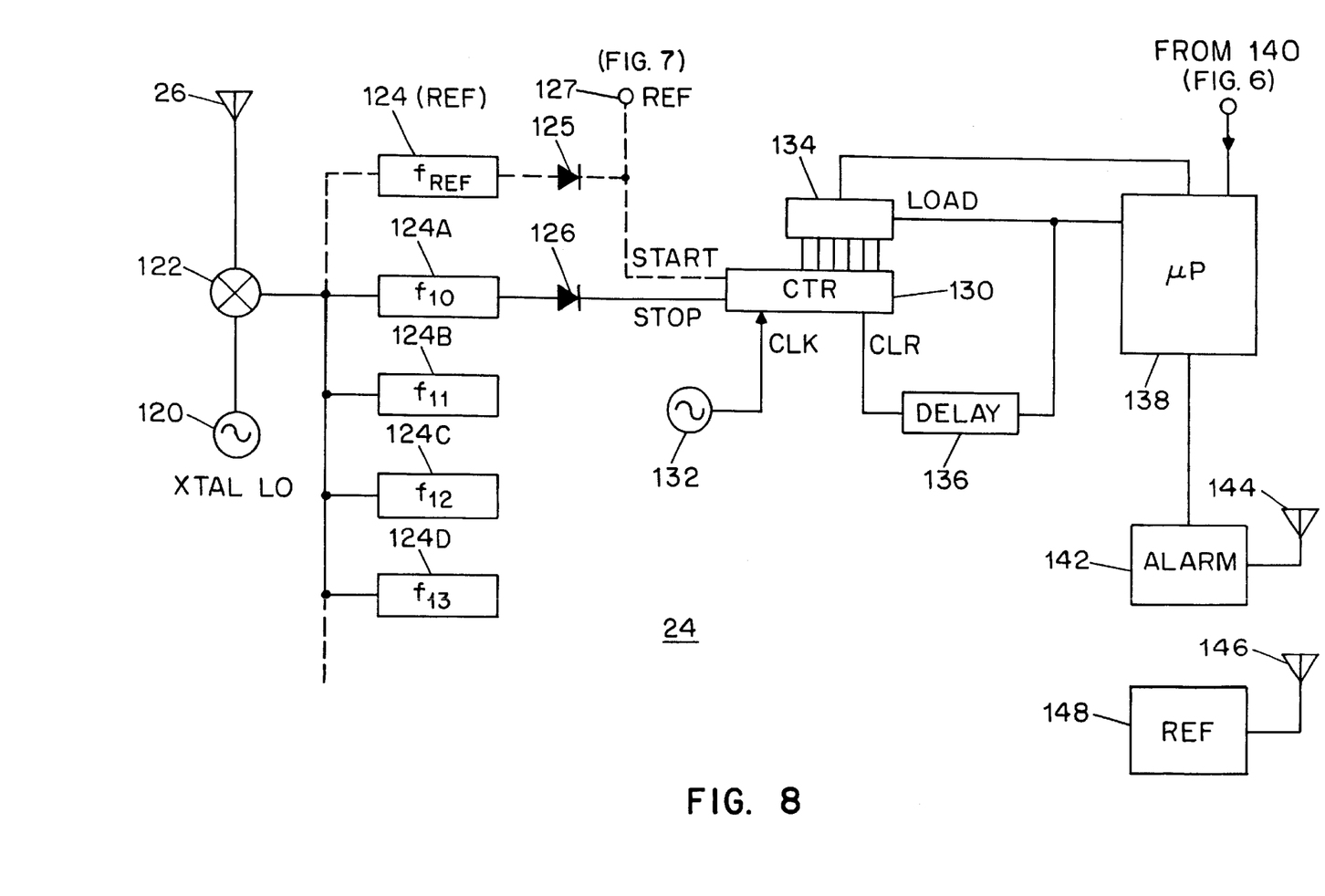
FIG. 8 shows a central station useful in the FIG. 1 system.
Figure 11:
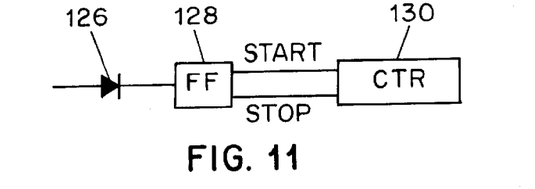
FIG. 11 shows an alternate arrangement for a portion of the central station of FIG. 8.

FIG. 8 shows a diagram of central station 24, which receives pulse signals emitted by the player transponders 50 and a reference timing signal. In each instance of a pulse from a player transponder and, where present, a reference transponder, the characteristics of the received pulse are the same, so the time between pulses can be accurately determined by simple threshold detection into a square wave pulse. Central station 24 includes a mixer 122 for receiving the r.f. the pulse signals from antenna 26, which are mixed with the output of local oscillator 120. The intermediate frequency signals are provided to a plurality of filters, one for each transponder signal frequency. Where the reference timing signal is also a transponder signal, a reference filter 124 REF and detector 125 are also provided. All transponder signal channels are the same, but only one is shown in detail. A time reference logic pulse signal, supplied to the terminal 127 from the time reference receiver 20 is used to start counter 130. Where the time reference signal is an r.f. signal from a reference transponder, a time reference pulse signal is provided by detector 125 to start counter 130. The filtered pulse signal from the player transponder 50 is threshold detected and used to stop counter 130. Counter 130 counts pulses form clock 132 and the accumulated count represents the angle to the player transponder. When a scan is completed, the data can be loaded from each counter 130 into latch 134. Thereafter the counter is cleared. The data in each latch 134 is read into processor 138 while the counter is loaded with data from the next scan.

Where the reference transponder of FIG. 6 is used, each player transponder will send one pulse when the reference signal is received and another pulse when the scanning beam signal is received. In this case, for each scan interval two pulses are received at the transponder frequency corresponding to each player. These pulses, when detected by detector 126 can be provided to a set-clear flip-flop 128 to operate the start/stop control of counter 130 as shown in FIG. 11.

Figure 10:
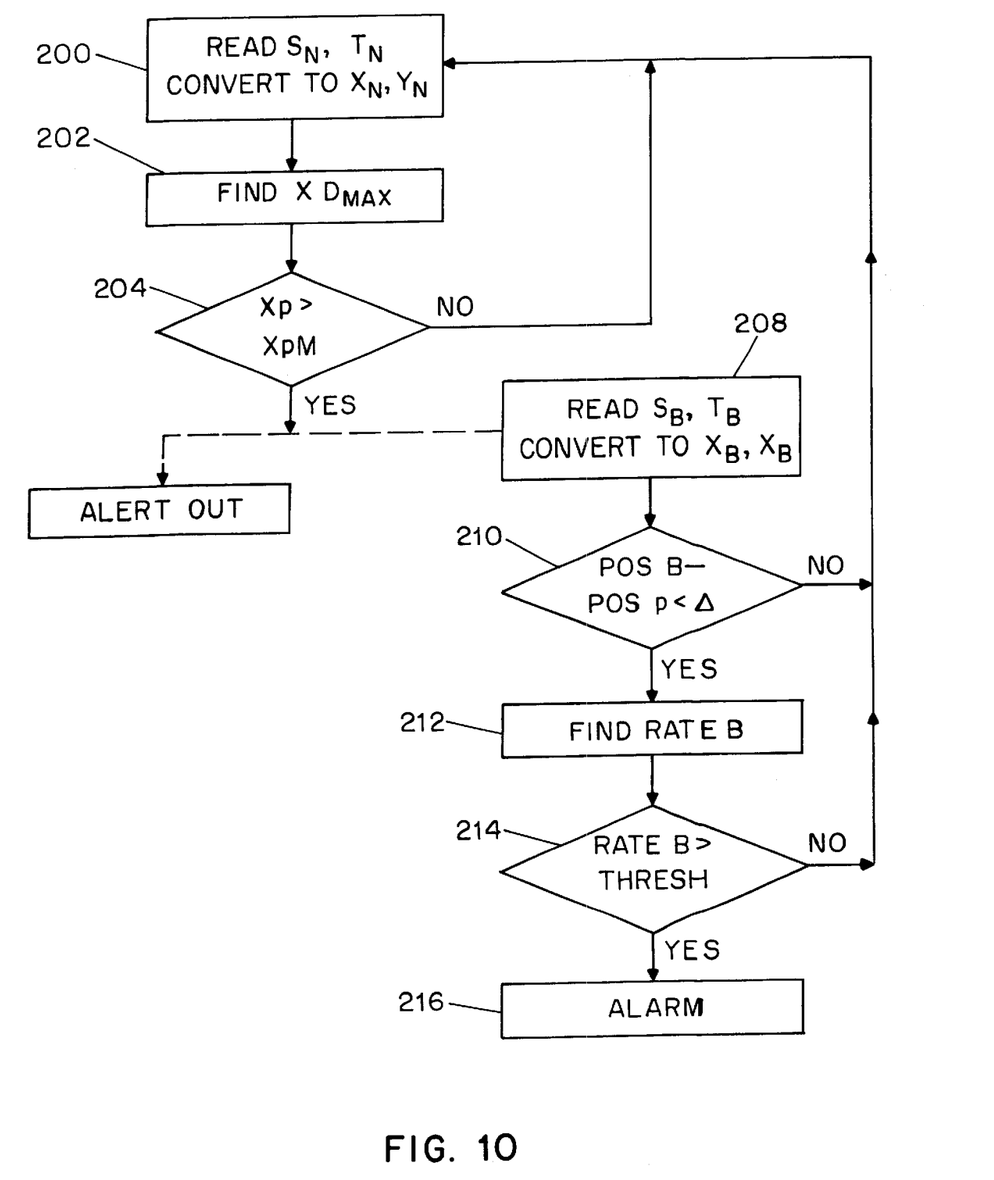
FIG. 10 shows a flow diagram of a computation useable in the FIG. 1 system.

FIG. 10 is a processing flow diagram for microprocessor 138. Data is received for the time between time reference pulse and scanning beam pulse for each player transponder, for each scanning antenna, designated $S_N$ and $T_N$. From this data the computer computes at least the x coordinate of each player in step 200 and determines the defensive player with the highest x coordinate in step 202 ($X_{DMAX}$). At step 204, the computer determines if any offensive player $P_N$ is closer to goal 12 than the closest defensive player, $D_{MAX}$. If not, the computation continues for the next scan data or half-scan data (next update of S or T). If it is determined that an offensive player is closer to goal 12 than any defensive player, two processors are possible.

First, an alert output is made at step 206, which causes an output signal to alarm transmitter 142 (FIG. 8) to send an alarm signal via antenna 144 to an alarm receiver 148 having antenna 146 carried by the referee. The alarm signal continues until there is no longer an offensive player in a forward position with respect to the defensive players. The referee can then observe the play while being apprized of relative player positions and exercise his discretion as to whether to call an "off side" offense.

Alternatively, the system may be arranged to compare the position and motion of the ball to determine if an off-side offense should be called. This calls for a further transponder in the ball, the position of which is detected the same as the position of the players. At step 208 the ball position is read and converted to x-y coordinates. At step 210, ball position is compared at the position of offensive players, to determine proximity, e.g., two or three feet. If such proximity exists, the rate of velocity of the ball is determined at step 212, and at step 214 it is determined whether the velocity of the ball has abruptly changed in magnitude and/or direction to detect action sending the ball toward the off-side player. If this event is detected, an off-side alarm can be sounded.

In the first system according to the invention it is appropriate to closely control the antenna rotation speed and to synchronize the two scanning antennas. The antennas can be simplified, since there is no need for rotary joint. The d.c. transmitter power is supplied onto the rotating antenna by a simple slip ring and this power can be turned on or off to control radiation when the antenna is pointing away from the field. To provide timely monitoring of player motion, rotation rates of 1 or 2 rotations per second, or greater, can be used. This speed is possible because of the simplicity of the transmitter (no rotary joints).

Figure 12:
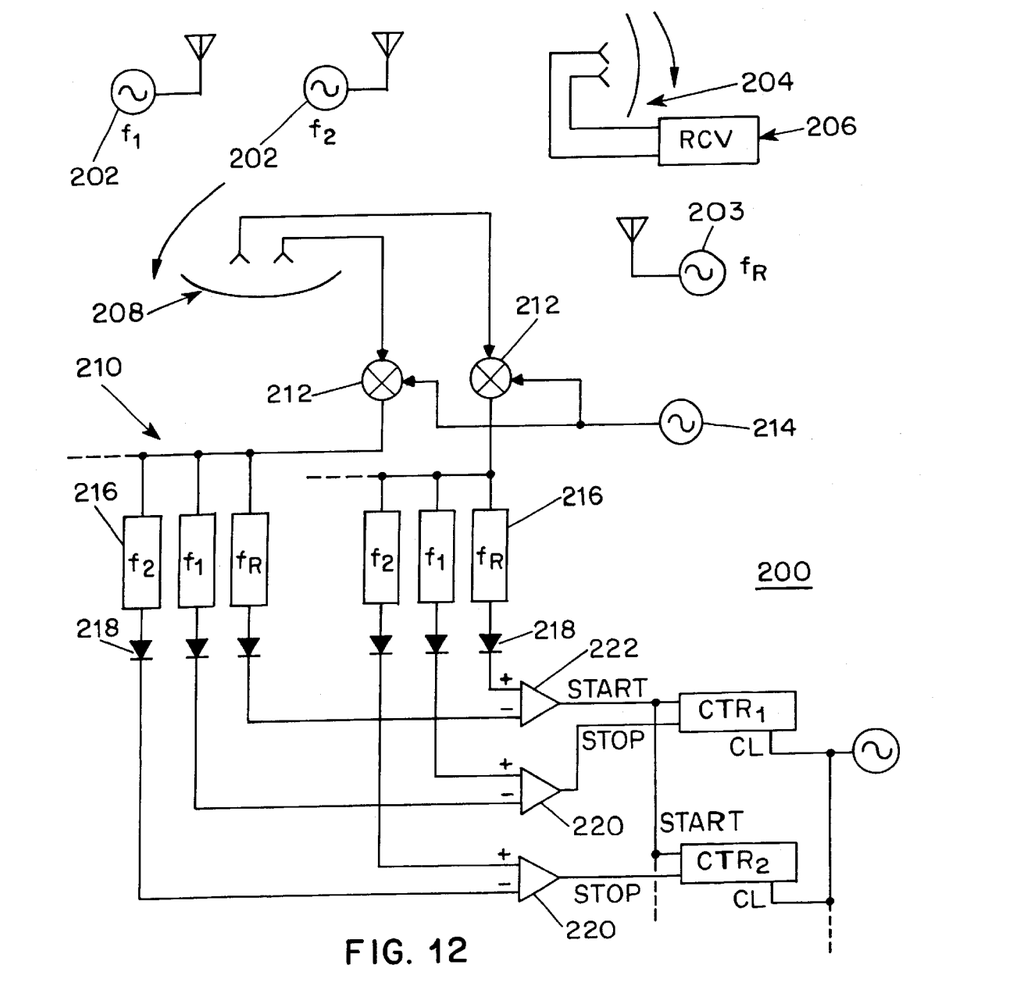
FIG. 12 shows an alternate arrangement for the system of the present invention.

An alternate system 200 according to the invention is shown in FIG. 12. The position locating system of FIG. 12 utilizes transmitters 202 at each of the players or objects to be located. Each transmitter 202 operates at a different frequency or is otherwise distinguishable, e.g. by modulation using a tone or code.

Two directional antennas 204, 208 are located near the field, as in the FIG. 1 system. Each antenna 204, 208 includes dual feeds for providing dual offset receiving beams and a dual channel receiver 206, 210. Receiver 210 is shown in detail; receiver 206 is similar or identical.

A reference transmitter 203 is also provided at a fixed reference location.

Antennas 204 and 206 are rotated to sweep their dual receiving beams across the field. Signals received by each of the dual antenna beams from the reference transmitter 203 and the transmitters 202 are provided to mixer 212 wherein they are mixed with a signal from local oscillator 214. A bank of band pass filters 216 are used to separate the different signals from the reference transmitters 203 and object/player transmitters 202. The filtered signals are detected by detectors 218 and compared in comparators 220 and 222 to detect the antenna beam crossover at boresight. The detected boresight signal from comparator 222 is used to start counters 224. The detected boresight signal form comparators 220 are used to stop counters 224. Clock signals from oscillator 226 are counted in counters 224 to derive a number representing the angle from reference transmitter 202, to locate the player in a manner as described with respect to the system of FIG. 1.

Alternately an electronically scanned antenna can be used. In this case position can be determined by comparing the forward and backward sweep.

Other location techniques, such as frequency/angle reference or ranging can be used. In addition other boresight detection techniques, such as sum and difference patterns can be used.

It will be appreciated that the system of the present invention can be used in applications other than sporting events to locate objects, such as locating vehicles in a military exercise or locating tagged animals in a forest.

While there have been described what are believed to be the preferred embodiment of the invention, those skilled in the art will recognize that other changes and modifications may be made thereto without departing from the invention, and it is intended to claim all such changes and modifications as fall within the true scope of the invention.

We claim:

1. Apparatus for determining the position of an object in a field, comprising:

first and second directional antennas at different locations adjoining said field, each of said antennas having at least one antenna beam pattern having predetermined relation to an electromagnetic antenna boresight, said antennas being mounted for rotation to scan said antenna beams across said field;

transmitting and receiving apparatus for transmitting signals between said object and said first and second directional antennas;

timing circuits coupled to said receiving apparatus for generating timing signals corresponding to said first and second directional antenna boresight coinciding with said object position;

reference timing apparatus for providing time reference signals for said antenna beam scanning of said first and second antennas;

and computation circuits responsive to said timing signals and said time reference signals for computing position of said object.

2. Apparatus as specified in claim 1 wherein said first antennas have and second antenna beam patterns comprise horizontally offset antenna beams having equal pattern amplitude at said electromagnetic antenna boresight.

3. Apparatus as specified in claim 2 wherein said timing circuits comprise comparison circuits for comparing signals from said first and second antenna beam patterns.

4. Apparatus as specified in claim 2 wherein said transmitting and receiving apparatus is for transmitting first and second on said first and second antenna beam patterns signals at different frequencies.

5. Apparatus as specified in claim 1 wherein said transmitting apparatus is coupled to said first and second directional antennas.

6. Apparatus as specified in claim 5 wherein said receiving apparatus and said timing circuits are on said object and wherein said timing signals are transmitted from said object to said computation circuits.

7. A system for locating objects on a field comprising:

first and second antennas, each radiating signals on multiple antenna beams at different frequencies and each arranged to scan said antenna beams over said playing field;

a receiver on each object to be located, said receiver for receiving said signals and for radiating timing signals in response thereto;

a reference timing apparatus for providing reference timing signals synchronized with scanning of said antenna beam;

and computation circuits responsive to said timing signals and said reference signals for computing position of said objects.

8. A method for locating an object on a field comprising:

radiating signals toward said field, said signals periodically sweeping across said field from first and second locations adjoining said field and providing at positions on said field periodic signals having intensities as a function of time that correspond to the angular direction from said locations to said position;

providing a receiver on each object to be located; and analyzing signals received by said receivers to thereby determine said angular direction of said object from said locations to thereby locate said object.

9. A method as specified in claim 8 wherein said signals radiating step comprises radiating in first and second antenna patterns from each of said locations.

10. A method as specified in claim 9, wherein said radiating step comprises radiating first and second antenna having angularly offset antenna patterns.

11. A method a specified in claim 10 wherein said radiating step comprises radiating signals on said first and second antenna patterns comprise signals at different frequencies.

12. A method as specified in claim 11, wherein said step of analyzing signals comprises comparing the amplitude of said different frequency signals to derive a time value and comparing said time value to a reference time value synchronized with said periodic sweeping.

13. A method for locating an object on a field, comprising:

radiating signals from said object;

providing first and second directional antennas at locations adjacent said field for receiving signals radiated from said object;

periodically sweeping the radiation receiving beam of said antennas across said field;

deriving timing signals from said signals received from said object corresponding to the time when said radiation receiving beams intersect said object;

providing reference timing signals synchronized with said periodic antenna sweeping; and computing the position of said object in response to said timing signals and said reference timing signals.

14. A method as specified in claim 13 wherein said antennas receive said signals on first and second directional beams.

15. A method as specified in claim 14 further comprising the step of comparing said signals received on said multiple beams to derive said timing signals.

16. A method as specified in claim 13 wherein there is provided a reference transmitter for transmitting reference signals, and wherein said directional antennas receive said reference signals to derive said reference timing signals.

17. A system for locating an object on a field comprising:

a transmitter for radiating signals from said object;

first and second directional antennas each arranged for horizontal rotation and each having a receiver for receiving said signals when the angular position of said antennas coincide with said object to derive timing signals;

a reference timing apparatus for providing reference timing signals synchronized with said antenna rotation; and computation circuits responsive to said timing signals and said reference timing signals for computing the position of said object.

18. A system as specified in claim 17, wherein said first and second directional antennas provide at least two directional antenna beams, and wherein said receivers include a comparison circuit for comparing signals received on said antenna beams to derive said timing signals.

19. A system as specified in claim 17 wherein said reference timing apparatus comprises a reference signal transmitter.

* * * * *